United States Patent [19]

Smith

[11] Patent Number: 5,170,893
[45] Date of Patent: Dec. 15, 1992

[54] DISC STORAGE SYSTEM

[76] Inventor: Brian D. Smith, 13210 Mercury Dr., Littleton, Colo. 80124

[21] Appl. No.: 770,017

[22] Filed: Oct. 1, 1991

[51] Int. Cl.⁵ .................... A47G 19/00; B65D 85/57
[52] U.S. Cl. ................................. 211/40; 206/309; 206/445; 211/41; 312/10
[58] Field of Search ............... 206/309, 445; 211/40, 211/41; 312/9, 10

[56] References Cited

U.S. PATENT DOCUMENTS

| | | |
|---|---|---|
| 1,303,299 | 5/1919 | Hahl . |
| 1,402,332 | 1/1922 | Wiehl .................... 211/40 |
| 1,420,004 | 6/1922 | Weide .................... 206/309 |
| 2,288,317 | 6/1942 | Greenberg .............. 211/40 |
| 2,354,872 | 8/1944 | Mitnick .................. 312/10 |
| 2,825,465 | 3/1958 | Burgo .................... 211/40 |
| 4,676,372 | 6/1987 | Rager . |
| 4,694,957 | 9/1987 | Ackeret . |
| 4,717,019 | 1/1988 | Ackeret . |
| 4,747,488 | 5/1988 | Kikuchi . |
| 4,753,343 | 6/1988 | Flynn . |
| 4,776,457 | 10/1988 | Ferraroni . |
| 4,778,047 | 10/1991 | Lay . |
| 5,027,950 | 7/1991 | Gutierrez . |
| 5,027,955 | 7/1991 | Shoemaker . |

Primary Examiner—Bryon P. Gehman
Attorney, Agent, or Firm—Brian D. Smith

[57] ABSTRACT

An apparatus for holding recording discs is disclosed. The apparatus includes a first plate defining a first slot for receiving a recording disc and a second plate defining a second slot for also receiving the disc and for cooperating with the first slot to substantially support the disc on the disc's outer edge. In addition, the second slot cooperates with the first slot to laterally stabilize the disc. The apparatus further includes a housing for supporting the first and second plates in spaced relationship from each other.

26 Claims, 4 Drawing Sheets

DISC STORAGE SYSTEM

TECHNICAL FIELD

The present invention relates generally to the storage of recording discs such as compact discs, laser discs, floppy discs and even vinyl records. More specifically, the present invention relates to a disc storage system which enables discs to be stored without having to first put the discs back into their liners, or in the case of compact discs, their jewel cases.

BACKGROUND ART

The art is replete with in-home and portable cases for storing old vinyl record albums and today's compact discs. Most of these systems and carrying cases require that the discs first be put back in their liners, or in the case of compact discs, in their jewel cases. Thus, the discs are not stored by themselves, but rather in the liners or cases in which they were sold. Accordingly, the user is actually forced to go through two storage procedures, the first procedure being the act of inserting or reinstalling the disc into its liner or jewel case, the second act being the actual storage of the disc-containing liner or jewel case into a storage system or carrying case of some sort. Having to perform both procedures is not only time-consuming, it is also inconvenient. Many people also find the process of opening the jewel box and mounting the disc properly onto the mound in the center of the jewel box to be quite confusing. The procedure is even more difficult for the driver of a motor vehicle who desires to change compact discs while he is operating the vehicle.

U.S. Pat. No. 4,694,957 to Ackeret discusses the problem of changing compact discs in an automobile while operating the automobile and provides a system for facilitating such which includes a plurality of holders, each of which houses a single compact disc. The holders are movable between a storage position and a disc removal position which presents a disc for removal and use. Ackeret also discloses that the walls of the holder are of concave construction so that only the outer edge of a disc can contact the holder.

While the device of Ackeret is interesting, it requires that a user push a button to eject the desired disc and further requires that the user exert a certain amount of pressure on the disc as it is being inserted into a holder to store the disc. It would also be difficult for an individual using this system to be able to identify which disc is stored in which holder unless each holder is labeled with the title of the music or data recorded on the disc. It also has a number of moving parts which would make the device somewhat difficult to manufacture. In addition, it would utilize a lot of material since each disc requires its own movable holder.

U.S. Pat. No. 1,303,299 to Hahl discloses a holder for holding older style phonographic records. The holder includes a sheet of flexible material—for instance paper board—which defines a series of curved or arcuate pockets, each of which is designed to hold a record. The width of each pocket is slightly less than the diameter of the record so that the ends of the pocket prevent the record from falling through the pocket. The flexible body portion enables the records to be tilted forward so that each successive disc is spaced slightly from the next disc, which would appear to facilitate grasping of each disc.

While the Hahl holder is interesting and would appear to work as long as the system is suspended in a vertical position, it would not appear to keep the discs sufficiently separated from each other if it were placed in a horizontal position. The sides of the records would likely contact each other and thus become scratched and/or dented when the holder is positioned horizontally. In fact, even in a vertically oriented position, it is quite likely that the sides of pocket 6 would scratch the sides of a record being inserted and/or removed from a pocket.

Other patents found in a search for subject matter related to the present invention are as follows:

| | | | |
|---|---|---|---|
| 4,676,372 | 4,776,457 | 4,778,047 | 5,027,955 |
| 5,027,950 | 4,753,343 | 4,747,488 | 4,717,019 |

In view of the above, it is apparent that while some systems have been developed for holding recording discs which enable a user to quickly store and remove discs, a need still exists for a system which is easier to use and simpler to manufacture than those described above and which protects the sides of discs being removed from and/or inserted into the system. Such a system would preferably enable one to quickly scan all discs stored in the system so that one is able to easily identify the title or artist of each disc. Moreover, such a system would preferably enable such scanning without requiring any labeling system for the discs. Such a system would also hold the discs securely so that they do not move when subjected to lateral shaking forces. In addition, such a system would preferably include a lid which, when closed, would preferably prevent the discs from shifting or moving relative to the system, no matter how the system is shaked, i.e. even if it is turned upside down.

DISCLOSURE OF THE INVENTION

The present invention addresses the aforementioned concerns by providing a system or apparatus for holding a disc-shaped recording disc having generally flat sides and an outer edge. The apparatus also referred to herein as a holder first continuous surface preferably a first plate defining a plurality of first slots for receiving disc-shaped recording discs wherein each first slot receives a disc-shaped recording disc without contacting the disc's sides.

In a preferred embodiment, the disc support means includes a second plate defining a second slot for receiving the disc. The second plate is selectively placed from the first plate to stabilize a disc inserted in the first and second slots so that the disc is prevented from rocking and rolling, i.e. laterally stabilized when the holder is subjected to lateral shaking forces. In addition, the first and second slots preferably support a disc so that more than one-half of the disc projects outwardly from the first slot. The outward projection of the disc facilitates its grasping by an individual desiring to remove the disc from the holder.

The first and second slots are preferably elongate in nature and defined by their respective plates to have a pair of opposing ends for contacting the outer edge of a disc to support the disc. In addition, each slot preferably has a pair of opposing sides extending between its opposing ends which are sized and configured and spaced from each other to avoid contact with the sides of a disc being inserted into the slot. Concavely shaped and V-shaped sides have been found to prevent such contact.

The holder also preferably defines a plurality of first and second slots also referred to herein as slot pairs for supporting a plurality of discs. In addition, the holder preferably includes a lid for sealing engagement with the holder to prevent dust from accumulating on discs stored in the holder. The lid preferably has a roof portion with an inner surface which is spaced from the first plate of the holder so as to just touch the outer edges of discs held by the holder when the lid is closed, i.e. sealingly engaging the holder. The contact with the discs' outer edges prevents the discs from sliding out of the slots when the holder is turned upside down.

The present invention also provides a method which enables an individual to change recording discs in a disc player located in a motor vehicle while the individual is operating a vehicle. The method comprises the steps providing a motor vehicle having a disc player and providing a recording disc storage apparatus including a first plate defining a plurality of slots, each of which is capable of receiving a recording disc. The storage apparatus also includes disc stabilizing means for cooperating with the slots to substantially support discs inserted in the slots on the discs' outer edges and laterally stabilize the discs. The method further includes operating the motor vehicle and steering the vehicle with one hand. In addition, the method includes removing a disc located in the vehicle's disc player by grasping it with the free hand and inserting it into an empty slot of the storage apparatus. The individual then scans the discs located in the other slots to locate a desired disc. The desired disc is then grasped with the free hand and then inserted into the disc player, thereby completing the process of changing recording discs in the disc player.

BRIEF DESCRIPTION OF THE DRAWINGS

The invention will be more readily understood by reference to the accompanying drawings wherein like reference numerals indicate like elements throughout the drawing figures and in which.

DETAILED DESCRIPTION OF PREFERRED EMBODIMENTS

Figure 1:
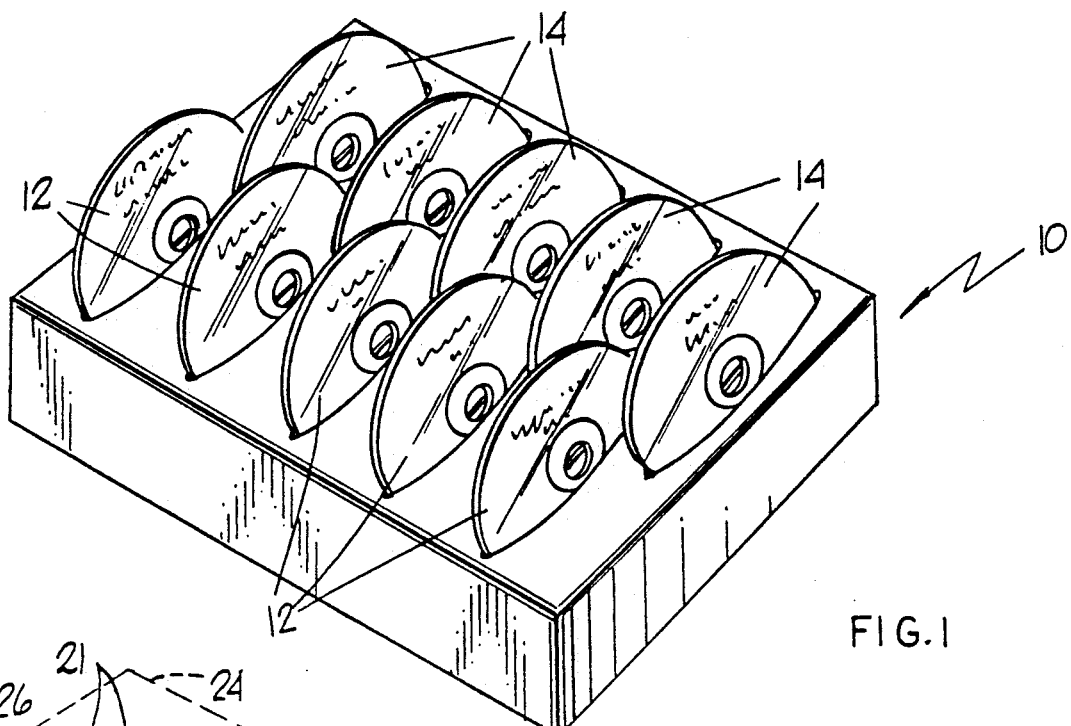
FIG. 1 is a perspective view of a recording disc holder of the present invention which holds discs in a staggered relationship.

FIG. 1 illustrates a disc holder 10 of the present invention for holding ten compact discs in staggered relationship on two parallel axes. It will be appreciated that five discs 12 are held by holder 10 along one axis while the second set of five discs 14 are held along a second axis. The staggering of the discs about two axes as illustrated makes it easier for a user to be able to identify the title or artist of each disc. The discs are also, as illustrated, tilted slightly from vertical, about 20 degrees, which also makes it easier to observe the titles of the discs.

Figure 1A:
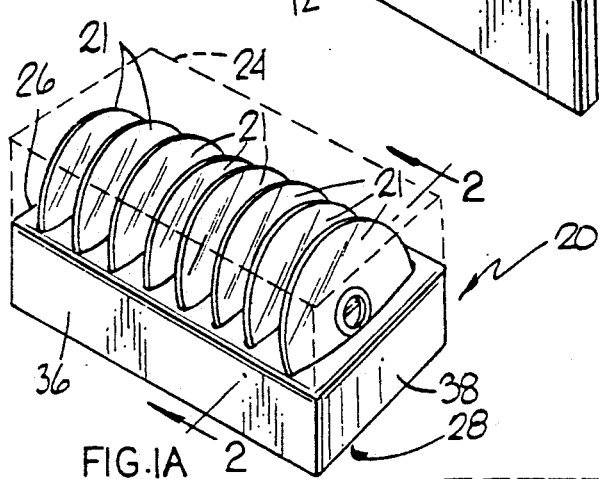
FIG. 1A is a perspective view of another holder of the present invention which holds discs in single file relationship.

FIGS. 1A through 5A illustrate a disc holder 20 of the present invention which is identical to that of FIG. 1 with the exception that all discs are held about a single common axis. FIG. 1A also shows in dotted line a lid 24 for holder 20 which could be attached to holder 20 with a hinge (not shown) along edge 26 of the holder. Alternately, the lid could be adapted to snap into grooves (not shown) provided along holder 20's top edges (not numbered).

Figure 2:
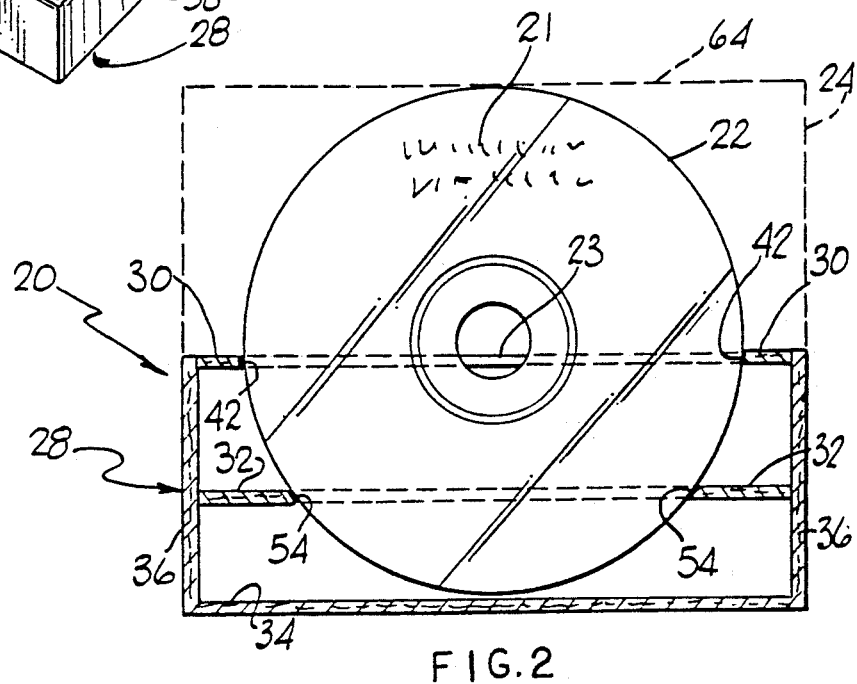
FIG. 2 is a cross-sectional view taken along lines 2—2 of FIG. 1A.

FIG. 2 is a cross-sectional view of holder 20 taken along lines 2—2 of FIG. 1A. As illustrated, holder 20 consists primarily of a housing or frame 28 which includes a top or first plate 30, a second or middle plate 32, and a bottom 34, all of which are held together by side walls 36 and end walls 38 of the housing.

Figure 3:
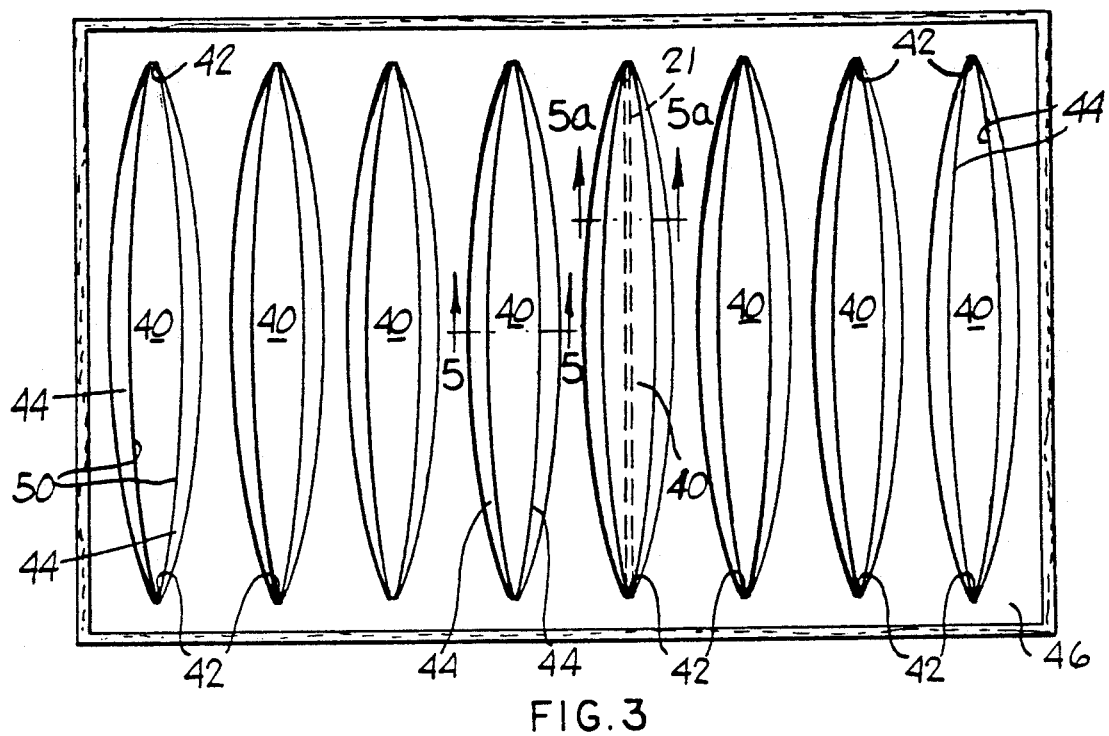
FIG. 3 is a top view of the first plate of the embodiment of FIG. 1A.

FIG. 3, which is a top view of top plate 30, illustrates that plate 30 is provided with a plurality (in this particular instance) eight slots 40, each of which is designed to hold a single disc 21. For purposes of clarity no discs are shown in FIG. 3 with the exception that a disc 21 is shown in dotted line in the fourth slot from the plate's right side.

Figure 5:
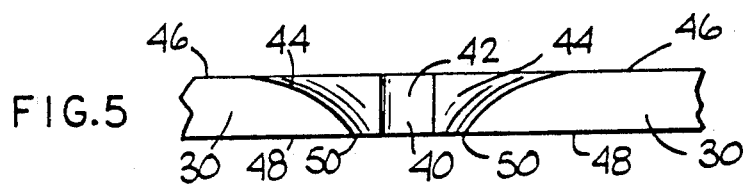
FIG. 5 is a cross-sectional view taken along lines 5—5 of FIG. 3.
Figure 5A:
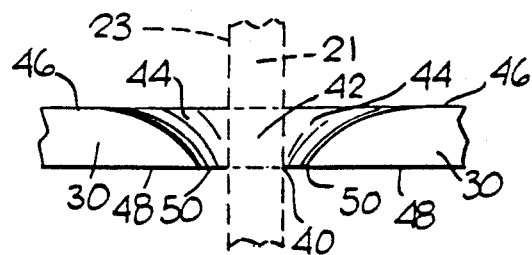
FIG. 5A is a cross-sectional view taken along lines 5A—5A of FIG. 3.

FIG. 3, 5, and 5A illustrate that each slot 40 is generally elongate in nature, actually oval shaped as viewed from the top, and defined by plate 30 to have a pair of opposing ends 42 and opposing sides 44. Ends 42 preferably have a width which is slightly greater than the width of disc 21 so that the disc's outer edge 22 is capable of contacting and actually being supported by ends 42. (See FIG. 2) Ends 42 and side walls 44, as best illustrated in FIGS. 5 and 5A also adjoin the upper surface 46 and the underside surface 48 of plate 30. Side walls 44 actually adjoin underside surface 48 at edges 50 which as viewed from above in FIG. 3 are concave in shape. Together, concave edges 50 provide slot 40 with the previously mentioned oval-shaped look. Each side wall 44 also has a concave appearance when viewed from above. Those skilled in the art will appreciate the use of concavely shaped edges 50 and side walls 44 prevents the sides 23 of a disc 21 being inserted into a slot from contacting edges 50 or side walls 44 of the slot, i.e. both as it is being inserted and withdrawn from the slot. While concavely shaped edges and sides are illustrated in this embodiment of the present invention, it will be understood that other shapes including wide V-shaped edges and sides would also prevent such side contact.

FIGS. 5 and 5A further illustrate that the edges adjoining side walls 44 and top surface 46 of plate 30 have been rounded off. This rounding off of the edges, or beveling, serves to direct or facilitate insertion of a disc into the slot. It will be appreciated that the outer edge 22 of a disc can contact the slot's side walls 44 as it is being inserted into the slot. However, the disc's sides 23 should not be able to touch the side walls since, as previously explained, the concave shape of the side walls and edges 50 prevents such.

Figure 4:
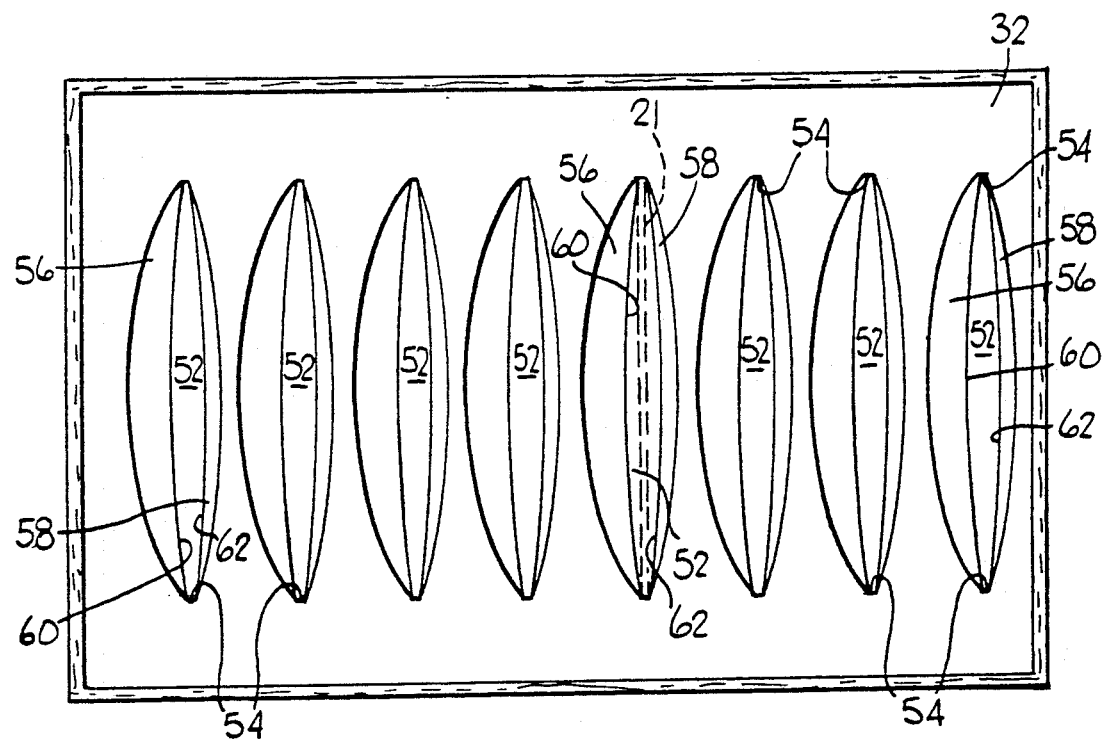
FIG. 4 is a top view of the second or middle plate of the embodiment of FIG. 1A.

FIG. 4 provides a top view of second or middle plate 32 which defines a second series of slots 52 for supporting a disc 21. Slots 52 are provided with ends 54 which are similar to ends 42 of slots 40 in that they are preferably slightly wider than a disc's outer edge 22 so that the discs can be inserted in the slots and supported thereby. Slots 52 are also provided with opposing side walls 56 and 58 which terminate respectively at edges 60 and 62 which are similar to sidewalls 44 and edges 50 of slots 40. It will be appreciated, however, that while the edges and side walls are concavely shaped as viewed from above, the left side walls and edges, i.e. side walls 56 and edges 60, are more curved than the right side walls 58 and edges 62. The effect of this is to provide slots 52 with a "wider" left side so that a disc being inserted through upper slot 40 will be "caught" by the left side of the slot and guided into the slot until the disc's outer edge 22 contacts opposing ends 54 of the slot which supports the disc. Slots 52 are preferably provided with the wide left side since each slot 52 is slightly offset to the right of its corresponding upper slot 40. The lower slots 52 are offset slightly so that the discs held by slots 40 and 52 are tilted slightly as illustrated in FIGS. 1 and 1A, which as previously mentioned, makes it easier for an individual to observe the disc's titles. Side walls 56 and 58 are also preferably beveled in a fashion similar to side walls 44 of slots 40 to guide the discs into slots 52.

In view of the above, it will be appreciated that when a disc is inserted in a pair of slots 40 and 52 (sometimes referred to herein as a slot pair) the disc will be completely supported on its outside edge 22 by ends 42 and 54 of the slots. It will also be appreciated that the disc's sides 23 will not be able to contact the slots' sides or edges.

FIG. 2 illustrates that the outer edge 22 of a disc held by slots 40, 52 does not contact bottom 34 of the housing. While such non-contact is preferred, slots 40, 52 and housing 28 could be dimensioned so that a disc's outer edge 22 just touches the inner surface of bottom 34. This would make the housing slightly shorter and would also use slightly less material, thereby slightly reducing the cost of the housing.

FIG. 2 further illustrates that plates 30 and 32 are parallel to each other. In addition, it can be seen that the distance between the opposing ends 42 of a slot 40 is slightly less than the diameter of the disc. As such, more than one-half of the disc held in the slots projects outwardly from slot 40. This makes it easy to grasp the disc and hold it by its outer edge 22. This also enables one to grasp the disc by inserting a finger through its center hole (not numbered) which is also partially exposed. (See FIG. 2).

FIG. 2 also illustrates that middle plate 32 is spaced from upper plate 30 so that the disc is held firmly i.e. laterally stabilized when it is inserted into the slots. This prevents the disc from moving i.e. rolling or rocking when the holder is subjected to lateral shaking forces. To provide such stability, it has been determined that the distance between the opposing ends 54 of slot 52 should be between about 70 and 90 percent of the disc's diameter.

As previously mentioned, the holder is preferably designed so that the discs are titled slightly which makes it easier for an individual to observe the disc's titles. In the embodiments of FIGS. 1 and 1A, the discs are preferably tilted so that they form an included angle of about 70 degrees with the common axis of the discs, i.e. as measured from the planes of the discs. This included angle could, however, range anywhere from approximately 45 degrees to 90 degrees.

As also previously mentioned, holder 20 is preferably provided with a lid 24. Lid 24 prevents dust from accumulating on discs stored in the holder. FIG. 2 illustrates that lid 24 is also preferably dimensioned so that its roof portion 64 is spaced from upper plate 30 to just touch the outer edges of the discs when the lid is closed i.e. sealingly engaging housing 28. By dimensioning the lid in this manner, the discs are prevented from sliding out of the slots when the holder is turned upside down. Thus, the discs will not be able to move whatsoever when the lid is closed since, as previously mentioned, the slots are designed to prevent lateral movement of the discs as well (i.e. even without a lid).

Figure 6:
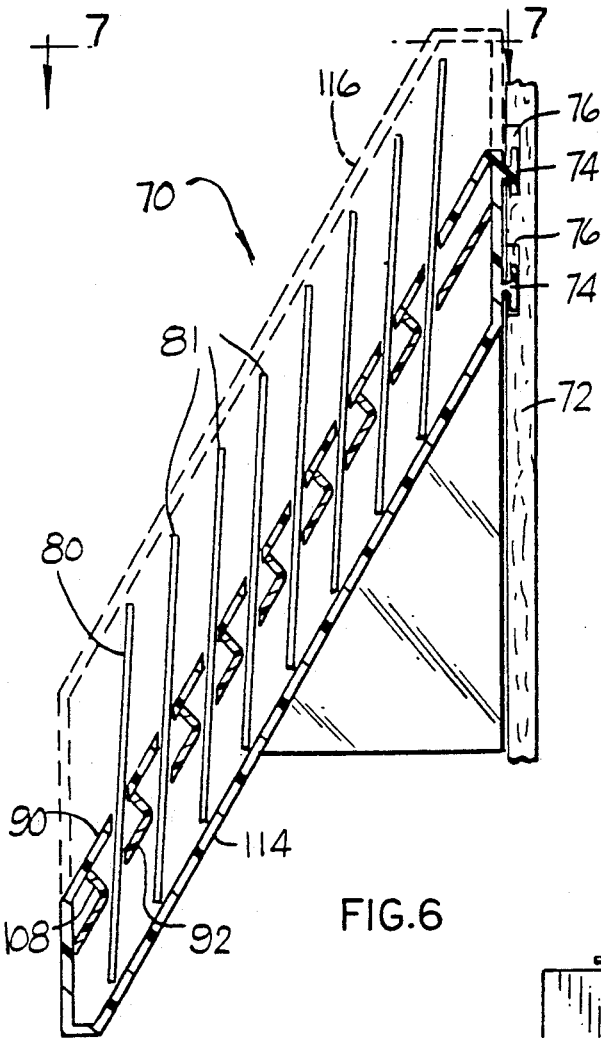
FIG. 6 is a cross-sectional view of another disc holder of the present invention for mounting to a vertical surface or wall.
Figure 8:
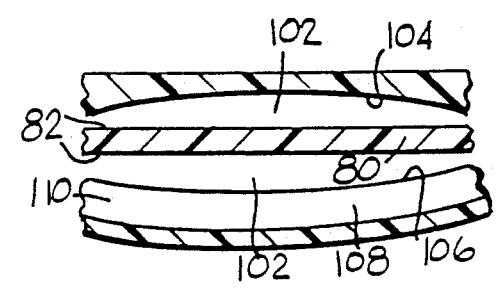
FIG. 8 is a cross-sectional view taken along lines 8—8 of FIG. 6.
Figure 7:
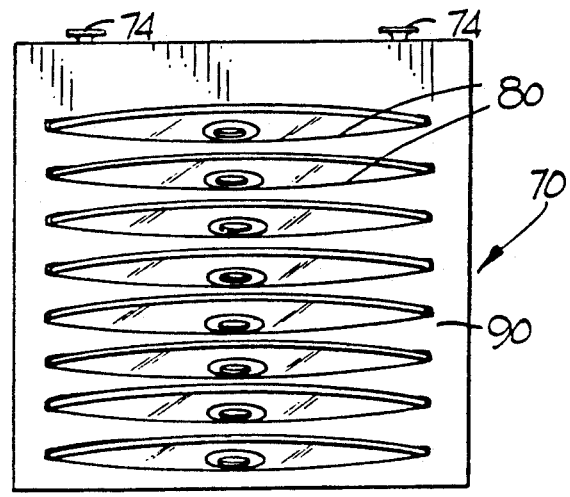
FIG. 7 is a top view of the holder of FIG. 6 taken along the lines 7—7 of FIG. 6.

FIGS. 6 through 8 illustrate another disc holder 70 of the present invention which is designed to be mounted to a vertical surface or wall 72. FIG. 6 illustrates that holder 70 is provided with a pair of elements 74 which slide into a pair of grooves 76 provided in the wall to secure the holder to the wall. Hook and loop type fasteners such as those sold under the well-known trademark "Velcro" could also be used to secure holder 70 to a wall or vertical surface. Velcro would be ideal for use in attaching holder 70 to the dashboard of a motor vehicle because it would enable one to remove the holder as desired.

FIGS. 6-8 illustrate holder 70 holding eight discs 80 having outer edges 81 and sides 82. In FIG. 6, it can be seen that each disc forms an included angle of about 30 degrees with the common axis of the discs. It can also be seen that each disc is tilted backwards somewhat with respect to vertical. As with the previous embodiment, this tilting of the disc makes it easier to observe the disc's titles. It will also be appreciated that this embodiment of the invention arranges the discs in what will be referred to as a diagonal or echelon arrangement which also facilitates observation of the disc's titles in addition to making it easier to grasp the discs.

FIG. 6 illustrates that holder 70 is similar to holder 20 of the present invention in that top and middle plates 90 and 92 are provided which are similar to top and middle plates 30 and 32 of holder 20. Plates 90 and 92 are also respectively provided with slots 100 and 102 which are similar to slots 40 and 52 of holder 20 i.e. slots 100, 102 both preferably include opposing ends and opposing sides similar to those of the previous embodiment. The opposing ends support the discs on their outer edges and the opposing sides are concavely shaped so as to avoid contacting sides 82 of a disc being inserted into, removed from and held in the slots.

Figure 6A:
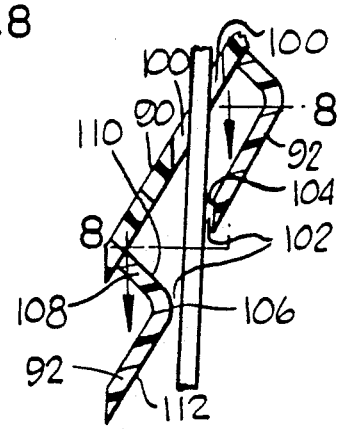
FIG. 6A is an enlarged view of a portion of FIG. 6 showing the insertion of a disc in the first and second slots of this holder.

FIG. 8 is a cross-sectional view taken along lines 8—8 of FIG. 6A which shows the curved or concave shape of opposing sides 104 and 106 of a slot 102. It will thus be appreciated that slot 102 is similar to slot 52 of the previous embodiment. However, because of this holder's generally vertical orientation, this holder additionally includes a concavely-shaped "shoehorn" lip portion 108 having a surface 110 which catches and guides a disc into slot 102 without contacting the sides of the disc. It will be appreciated that a disc could fall or slide between plates 90 and 92, if lip 108 were not provided. As illustrated, lip 108 extends upwardly from opposing side 106 at an angle of about 80 degrees as measured from the plane of the second plate. It has been determined that the lip may project upwardly at any angle between about 30 degrees and 90 degrees depending on the vertical orientation of the holder, i.e. a more vertically oriented holder would utilize a lip portion forming a smaller included angle.

FIG. 6A shows that lip surface 110 smoothly adjoins side 106 of the slot from which it extends. In addition, it can be seen that side 106 smoothly adjoins the underside surface 112 of plate 92. The smoothness of these surfaces further protects the sides of a disc being inserted into slot 102, i.e. from contacting or being scratched by surfaces 112, 110 and 106.

FIG. 6 also illustrates that holder 70 has a bottom 114 which, as with the previous embodiment, may or may not contact the outer edges of discs held by the holder. In addition, holder 70 is also preferably provided with a lid 116 which, when closed, preferably contacts the outer edges of the discs to prevent the discs from falling out of slots 100, 102 when the holder 70 is turned upside down.

Figure 9:
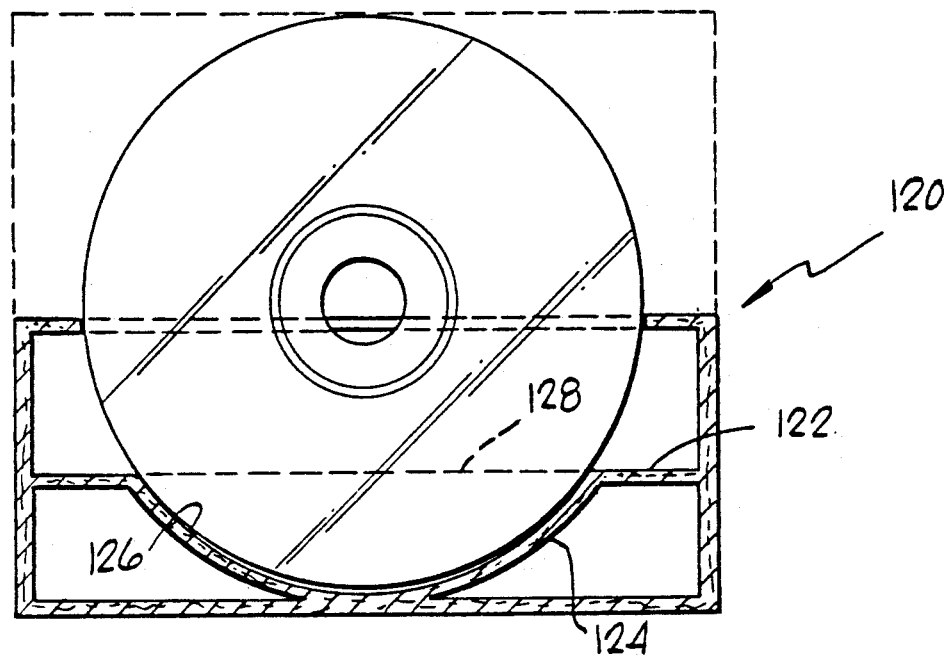
FIG. 9 is a cross-sectional view of another holder of the present invention wherein the second or middle plate defines a groove for supporting a disc inserted therein.

FIG. 9 illustrates another holder 120 of the present invention which is similar to that of FIG. 1A with the exception that the middle plate 122 is preferably injection molded so as to define a plurality of grooves 124 instead of open slots 52 of holder 20. Each groove 124 is very similar to the slots in previous embodiments in that each groove is elongate in nature and defined to have a bottom surface 126 which is similar to opposing ends of 42 and 54, i.e. bottom surface 126 supports a disc inserted in the groove on the disc's outer edge. Each groove 124 is also defined to have opposing side walls (not visible) which adjoin the bottom surface and extend to plate 122. The sidewalls are sized and configured, preferably concavely shaped (a tapering V-shape would work as well) to avoid contacting the sides of a disc inserted in the groove.

Figure 10:
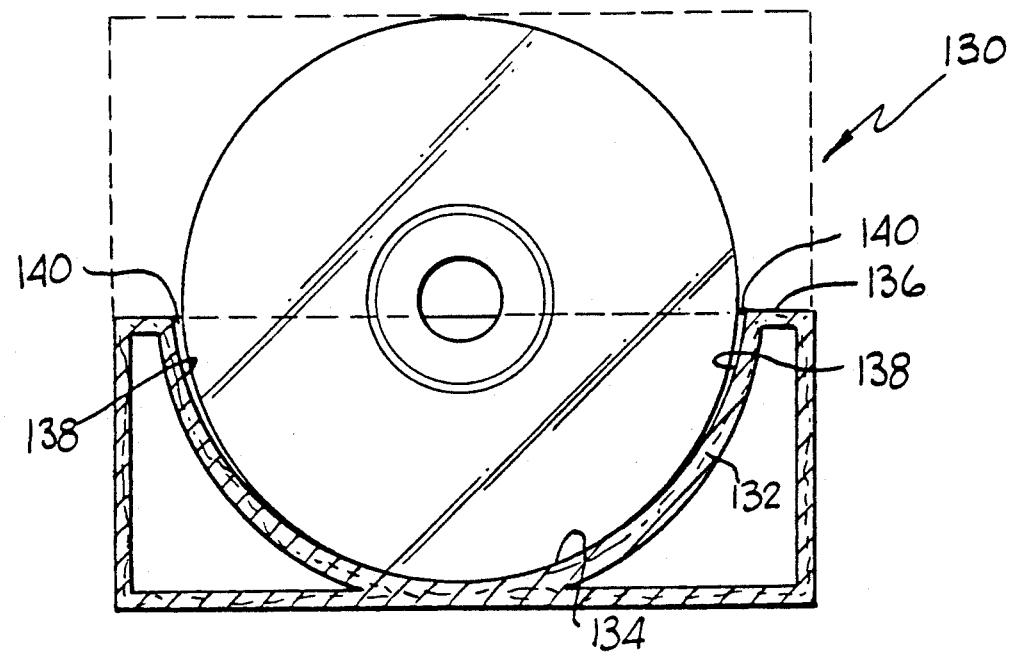
FIG. 10 is a cross-sectional view of yet another holder of the present invention wherein the top or first plate defines a groove extending to the bottom of the holder for supporting a disc inserted therein.

FIG. 10 illustrates yet another holder 130 of the present invention which is very similar to that of FIG. 9 with the exception that its groove 132 extends from its bottom surface 134 all the way to top plate 136 of the holder, thereby obviating the need for a second plate.

A close look at FIG. 10 will reveal that a portion 138 of bottom surface 134 does not contact the outer edge of the disc inserted in the groove. As such, a slight gap 140 is provided between the outer edge of the disc and portion 138 which facilitates insertion of a disc into the groove. Be that it may, to sufficiently stabilize a disc, i.e. to prevent it from rolling and rocking as previously described, the outer edge of the disc must make substantial contact with bottom surface 34, preferably at a point not much below the area identified as portion 138.

In view of the above, those skilled in the relevant art will appreciate that the present invention is capable of being expressed in many embodiments, all of which are capable of holding or storing a disc without having to first store the disc in its jewel box or liner. As such, it is anticipated that embodiments of the invention will find widespread use in both the home and on the road. For example, a holder such as holder 20 could be located in a sliding drawer of a home entertainment system which would be accessed by simply sliding the drawer out. Holders 20 and 70 are also ideally suited for use in an automobile since the titles of the discs can be easily scanned by the driver of the automobile. The discs of these holders are also easily grasped by a driver in one hand which thereby enables the driver to easily change discs with one hand while steering the automobile with the other hand.

Although the present invention has been described with a certain degree of particularity, it is understood that the present disclosure has been made by way of examples and that changes in details of structure may be made without departing from the spirit thereof.

What is claimed is:

1. An apparatus for holding disc-shaped recording discs each having generally flat sides and an outer edge, said apparatus comprising:
   a first continuous surface defining a plurality of first slot means, each of which receives a disc-shaped recording disc having generally flat sides and an outer edge wherein each first slot means has opposing sides selected from the group consisting of concavely-shaped and V-shaped sides for receiving a said disc-shaped recording disc without contacting the said disc's sides; and
   disc-stabilizing means for laterally stabilizing and supporting said recording discs received in said plurality of first slot means on the discs' outer edges without contacting the discs' sides.

2. An apparatus as claimed in claim 1 wherein said first continuous surface is defined by a first plate and said disc-stabilizing means includes a second plate defining a plurality of second slot means, each of which has opposing sides selected from the group consisting of concavely-shaped and V-shaped sides for receiving a said disc without contacting the said disc's sides and wherein each second slot means cooperates with one of said first slot means to define a cooperating pair of first and second slot means for laterally stabilizing and supporting a said disc without contacting the disc's sides, said second plate being selectively spaced from said first plate.

3. An apparatus as claimed in claim 2 wherein cooperating pairs of said first and second slot means are characterized as a plurality of slot pairs.

4. An apparatus as claimed in claim 3 wherein said plurality of slot pairs supports a plurality of discs along a common axis.

5. An apparatus as claimed in claim 4 wherein the plane of each supported disc forms an included angle of between about 90 degrees and 10 degrees with the common axis of said discs.

6. An apparatus as claimed in claim 5 wherein said first and second slot means of each slot pair are offset from one another so that discs inserted in said slot means form an included angle of less than 90 degrees with the discs' common axis.

7. An apparatus as claimed in claim 5 wherein the included angle is about 30 degrees.

8. An apparatus as claimed in claim 5 wherein the included angle is about 70 degrees.

9. An apparatus as claimed in claim 3 wherein said plurality of slot pairs supports a plurality of discs in staggered relationship on at least two parallel axes.

10. An apparatus as claimed in claim 2 wherein said first and second plates are sufficiently spaced from one another to laterally stabilize a disc inserted in said first and second slot means so that the disc is prevented from rocking and rolling when said apparatus is subjected to lateral shaking forces.

11. An apparatus as claimed in claim 2 wherein said first and second slot means support a disc so that more than one-half of the disc inserted in said slot means projects outwardly from said first slot means, the outward projection facilitating grasping of the disc.

12. An apparatus as claimed in claim 2 wherein each slot means is generally elongate in nature and defined by its respective plate to have a pair of opposing ends for contacting the outer edge of a disc to support the disc.

13. An apparatus as claimed in claim 12 wherein the distance between said opposing ends of a said first slot means is slightly less than the diameter of the recording disc, and wherein the distance between said opposing ends of said second slot means is between about 70 and 90 percent of the diameter of the recording disc, said first and second plates being spaced so that said opposing ends of both said first and second slot means contact the outer edge of a recording disc inserted in said slot means.

14. An apparatus as claimed in claim 12 wherein each slot means is further defined by its respective plate to have a pair of opposing sides extending between said opposing ends of said slot means, said opposing sides being sized, configured and spaced from each other so as to avoid contact with the sides of a disc being inserted into said slot means.

15. An apparatus as claimed in claim 14 wherein said opposing sides of each slot means adjoin the underside surface of said plate defining said slot means at edges which are sized, configured and spaced from each other so as to avoid contact with the sides of a disc being inserted into said slot means.

16. An apparatus as claimed in claim 14 wherein said second plate has an upper surface which faces a disc being inserted into its slot means and an underside surface facing the opposite direction, and wherein one opposing side of said slot means of said second plate further includes a lip portion which extends upwardly from said opposing side so as to project outwardly from said top surface of said second plate at an angle between about 30 degrees and 90 degrees, said lip portion defining a slot facing surface facing said slot means which is sized and configured to guide a disc into said slot means and yet avoid contact with the sides of the disc as it is inserted in said slot means.

17. An apparatus as claimed in claim 1 wherein each of said first and second plates defines an upper surface which faces a disc being inserted in its slot means and an underside surface facing the opposite direction, and wherein the edges adjoining said upper surface and said opposing sides of each slot means are beveled or rounded to facilitate insertion of a disc into said slot means.

18. An apparatus as claimed in claim 2 wherein said apparatus further includes a bottom in spaced relationship from said second plate.

19. An apparatus as claimed in claim 1 further comprising a lid for sealing engagement with said apparatus to prevent dust from accumulating on discs received in said plurality of said first slot means.

20. An apparatus as claimed in claim 19 wherein said lid defines a roof portion having an inner surface which is spaced from said first plate so as to touch the outer edge of a disc received in said first and second slot means when said lid is sealingly engaging said apparatus, the touching of which prevents the disc from sliding out of said first and second slot means when said apparatus is turned upside down.

21. An apparatus as claimed in claim 1 wherein said disc-stabilizing means defines a groove for receiving a disc.

22. An apparatus as claimed in claim 21 wherein said groove is elongate in nature and defined by said disc-stabilizing means to have a bottom surface for supporting a disc inserted in said groove on the disc's outer edge.

23. An apparatus as claimed in claim 22 wherein said groove defined by said disc-stabilizing means further includes opposing side walls adjoining said bottom surface which are sized and configured to avoid contacting the sides of a disc being inserted in said groove.

24. An apparatus as claimed in claim 23 wherein at least one of said groove's side walls is concavely shaped.

25. An apparatus as claimed in claim 23 wherein at least one of said groove's side walls has a tapering V-shape.

26. An apparatus as claimed in claim 23 wherein said opposing walls and bottom surface of said groove extend to the edge of said first plate defining said first slot means and are integral therewith.

* * * * *